UNITED STATES PATENT OFFICE.

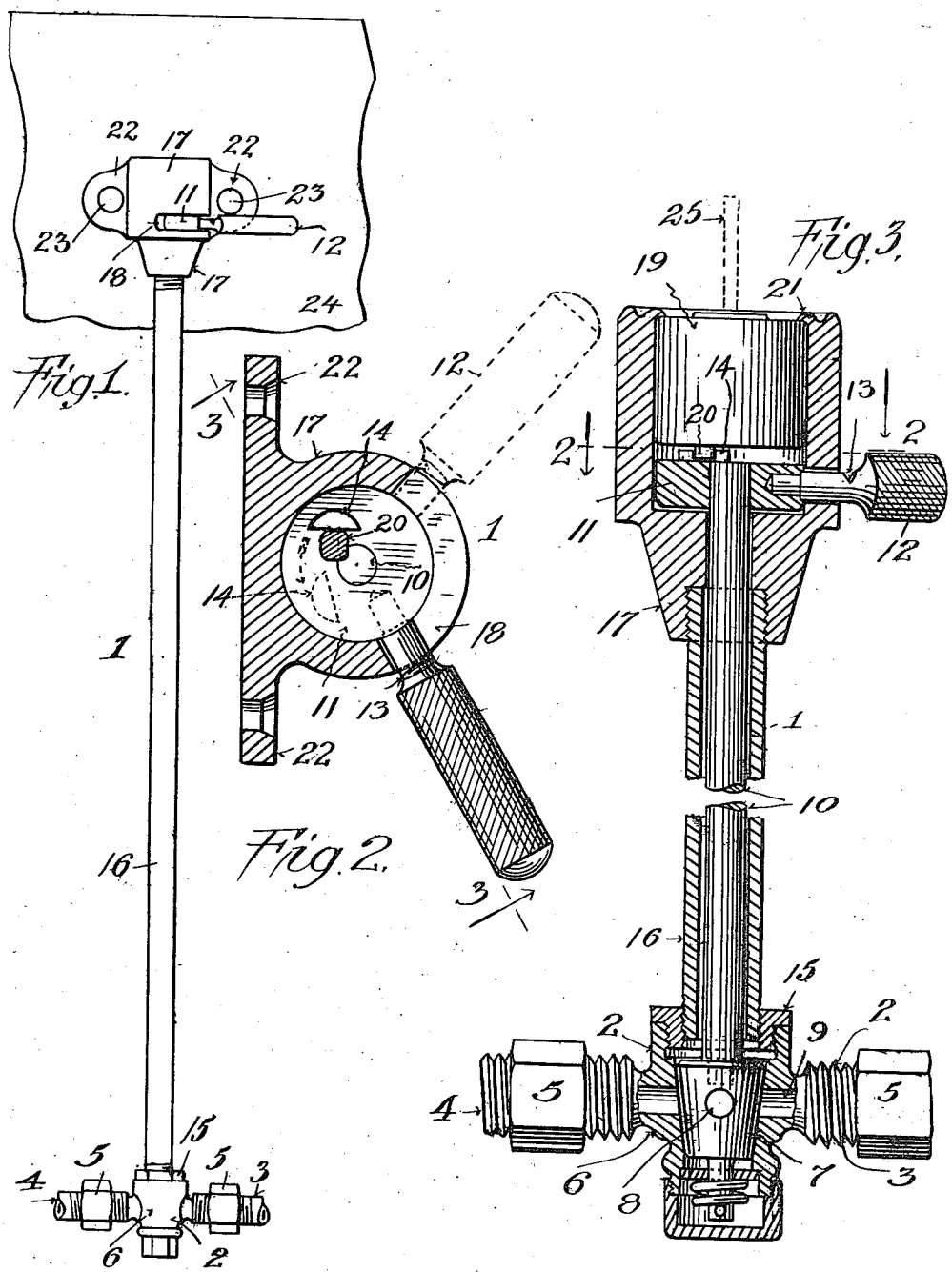

HARRY M. SHEDD, OF ELIZABETH, NEW JERSEY, ASSIGNOR, BY MESNE ASSIGNMENTS, TO RICHARD C. JENKINSON, OF NEWARK, NEW JERSEY.

GASOLENE-VALVE LOCK.

1,150,305.      Specification of Letters Patent.      Patented Aug. 17, 1915.

Application filed December 23, 1913. Serial No. 808,325.

*To all whom it may concern:*

Be it known that I, HARRY M. SHEDD, a citizen of the United States, and a resident of Elizabeth, county of Union, and State of New Jersey, have invented a new and useful Improvement in Gasolene-Valve Locks, of which the following is a specification.

The object of my invention is to provide a device of this class which may be applied wherever required, as to an automobile or to a motor boat, so as to prevent the same from being stolen; or to a gasolene tank so as to prevent the stealing of gasolene, or to any other suitable place. This object is accomplished by my invention, one embodiment of which is hereinafter set forth.

For a more particular description of my invention, reference is to be had to the accompanying drawings, forming a part hereof, in which—

Figure 1 is a front elevation of my improved valve lock with a part of the dashboard of an automobile or motor-boat being shown. Fig. 2 is a sectional view taken on the line 2—2 of Fig. 3, looking in the direction of the arrows. Fig. 3 is a longitudinal section of the structure, the section being taken substantially on the line 3—3 of Fig. 2, looking in the direction of the arrows.
Throughout the various views of the drawings, similar reference characters designate similar parts.

My improved valve lock 1, is provided with a suitable cock or valve 2 connected between the inflow and outflow pipes 3 and 4 held in proper relation thereto by means of unions 5, of the conventional kind. The valve 2 has a suitable casing 6 in which is placed a suitable plug 7 to fit the corresponding part of the casing 6, so that when this plug 7 is turned, the valve may be opened or closed, this plug being perforated at 8 for this purpose.

The plug 7 has an upwardly extending stem 10 which runs upwardly to a suitable disk 11 and to which it is fixed. This disk 11 has extending laterally therefrom a suitable handle 12 with a gap 13 so that this handle will be readily broken off, by excessive force for a reason which will appear below. Secured to the disk 11 and preferably integral therewith is the lug 14 which always moves with the disk 11 when the stem 10 is oscillated to open or close the valve 2.

The upper end of the casing 6 is provided with a suitable bushing 15 to which is fixed a suitable pipe or tube 16 to the upper end of which is secured a cup 17 which has its bore large so as to receive the disk 11 and permit the same to turn freely therein. The side of the cup 17 is recessed at 18 so as to permit the handle 12 to pass through the same, and above this disk 11 is a suitable lock 19 with a suitable bolt 20 adapted to engage the lug 14, which will be described below. The lock 19 is fixed in place in the cup 17 by means of a suitable integral collar 21 which is forced over this lock, or by any other suitable means. The cup 17 is preferably provided with suitable integral ears 22 which are perforated and provided with bolts or screws 23 so as to hold the cup 17 in place on a dashboard 24, or other suitable support. The lock 19 may be of any suitable form, but is preferably a lock which is fitted by a flat key 25 of the desired kind.

In view of the foregoing, the operation of my improved lock will be readily understood. When the bolt 20 is raised into the lock 19, so as to be free of the lug 14, the gasolene supply may be turned off and on through the valve 2 by use of the handle 12. When the bolt 20 is lowered, it is so placed that it comes in contact with the lug 14, as indicated in Fig. 2, when the valve 2 is closed, so that any attempt to open the valve will be frustrated and the valve kept closed, whereby no gasolene can pass from the tank to the engine. If excessive force is applied to the handle 12 so that something must break, the handle 12 will break off at the weakest place 13, which is weakened for this purpose, so that if a thief attempts to steal an automobile provided with this lock and attempts to throw the valve 2 open when the bolt 20 is lowered, he will break the handle 12, as just above described, which is weaker than the lugs 14 or 20, so that he cannot in any way open the valve 2.

While I have shown and described one embodiment of my invention, it is obvious that it is not restricted thereto, but is broad enough to cover all structures that come within the scope of the annexed claim.

Having thus described my invention, what I claim is:

In a device of the class described, a valve, a casing for said valve, a stem, a perforated plug secured to the end of said stem, a disk secured to the other end of said stem, a casing surrounding said disk, a pipe surrounding said stem and extending between the valve casing and the casing surrounding the disk, a recess in the casing surrounding the disk, a handle secured to said disk and extending through said recess, a weakened portion on said handle adjacent the exterior of the casing, a lock contained within said casing, a movable portion on said lock, a projection on said disk, said movable portion on the lock adapted to come into contact with the projection on the disk and prevent rotation of the disk within the casing.

Signed at the city of New York, county of New York, and State of New York, this 19th day of December, 1913.

HARRY M. SHEDD.

Witnesses:
H. RADZINSKY,
H. S. WALLENSTEIN.